Aug. 17, 1954     L. LOMBARDI     2,686,507
SLEEVE VALVE SYSTEM

Filed March 6, 1952     2 Sheets-Sheet 1

INVENTOR.
LEO LOMBARDI
BY R.W. Hodgson

Aug. 17, 1954     L. LOMBARDI     2,686,507

SLEEVE VALVE SYSTEM

Filed March 6, 1952     2 Sheets-Sheet 2

INVENTOR.
LEO LOMBARDI
BY R. W. Hodgson

Patented Aug. 17, 1954

2,686,507

UNITED STATES PATENT OFFICE 2,686,507

SLEEVE VALVE SYSTEM

Leo Lombardi, Los Angeles, Calif.

Application March 6, 1952, Serial No. 275,139

11 Claims. (Cl. 123—75)

Generally speaking, the present invention relates to an improved sleeve valve system for use in reciprocating-piston internal combustion engines and adapted to provide extremely large effective intake valve area and effective exhaust valve area and to provide the effective intake valve and the effective exhaust valve with a structural arrangement whereby they will be extremely rapid-opening and rapid-closing in a manner generally similar to the opening and closing characteristics of poppet valves but with none of the disadvantages thereof.

It has long been recognized that the effective intake and exhaust valve areas, to a very substantial degree, determine the operating characteristics of a reciprocating-piston internal combustion engine. For maximum power output of the engine, said valves should be of large effective area. However, this has been exceedingly difficult to provide in prior art reciprocating-piston engine valve structures for various reasons well known in the art. Therefore, in most cases, poppet valves of an effective area limited by the structure of the cylinder head adjacent the combustion chamber portion of the cylinder, have been employed.

These prior art arrangements seriously limit the effective power of a reciprocating-piston internal combustion engine because of the relatively small size thereof and also because each of the valve stems even further restricts the effective valve area. Furthermore, the valve stems are frequently undesirable for various other mechanical and structural reasons.

In fact, the only major desirable feature of such prior art poppet valve arrangements is the fact that poppet valves open and close relatively rapidly, which is important for efficient operation of a reciprocating-piston type of internal combustion engine.

I am aware of the fact that various prior art attempts to at least partially solve the disadvantages of poppet valves have been made heretofore. These have usually comprised sleeve valves of one type or another and have had major disadvantages of their own.

For example, most such prior art sleeve valves have been of the type having a multiply perforated or apertured sleeve adapted to be gradually slidably brought into effective communication with a valve port and the combustion chamber of a cylinder whereby to effectively provide a valve. This type of arrangement comprises a slow-opening and slow-closing valve which is not adapted to produce the greatest efficiency in an internal combustion engine of the reciprocating-piston type, which requires fast-opening and fast-closing valves.

Furthermore, such multiply perforated or apertured sleeve valve arrangements do not usually provide an effective seal during the compression and firing strokes of the engine.

In addition, such prior art multiply apertured sleeve valve arrangements (and indeed all prior art sleeve valves known to me) do not provide an effective valve area very much greater than any standard poppet valve arrangement.

Generally speaking, the system of the present invention includes a cylinder defined by a cylinder wall and a cylinder head across one end thereof (usually, though not necessarily, the upper end thereof). Also included is fuel intake port means effectively extending through said cylinder wall (usually in a lateral direction) and combustion products exhaust port means also extending through said cylinder wall (usually virtually laterally and at a point virtually opposite the fuel intake port means). Also included is cylindrical sleeve valve means usually in the form of an integral non-apertured cylindrical sleeve and usually provided with an angularly inclined upwardly and inwardly facing engaging surface slidably mounted within the cylinder wall adjacent the inner surface thereof for slidable valve opening and valve closing reciprocating movement across the intake port means and the exhaust port means. Also included is valve seat means (usually angularly inclined and downwardly and outwardly facing) positioned adjacent the cylinder wall and adjacent the intake port means and the exhaust port means (usually on the upper sides thereof). Also included is means (usually spring means) normally biasing the sleeve valve means (usually upwardly) against said valve seat means whereby to effectively seal and close both the intake port means and the exhaust port means. Also included is split sleeve actuating means having separate actuating portions (usually two) of arcuate shape slidably positioned with respect to the inner side of the cylinder wall and in abutting relationship with respect to the cylindrical sleeve valve means whereby reciprocating actuation (usually downward) of the first of said split sleeve actuating portions against the first of said port means (either the intake port means or the exhaust port means) will cause said sleeve valve to slidably move (usually downward) against the action of the biasing means in a manner whereby the second of said port means (either the exhaust port means or the intake port means) will be rapidly and effectively opened; and whereby reciprocating actuation (usually downward) of the second of said split sleeve actuating portions against the sleeve valve and across the second of said port means will cause said sleeve valve to slidably move (usually downward) against the action of the biasing means in a manner whereby the first of said port means will be rapidly and effectively opened. Also included is means (usually pivotally mounted rocker arm means) in actuating relationship with respect to the actuating portions of the split sleeve actuating means and also effectively mechanically linked with respect to a piston adapted to be slidably reciprocably mounted in the cylinder, whereby each actuating portion of said split sleeve actuating means will be actuated at the proper time to open and close the intake port means and the exhaust port means at the proper times and in the proper sequence during the operating cycle of the engine.

From the above general description of the basic form of the present invention, it will be apparent to those skilled in the art that virtually all of the hereinabove mentioned disadvantages of prior art valve systems for internal combustion engines are virtually entirely eliminated and overcome in and through the use of the system of the present invention.

For example, since each of the effective valve areas comprises virtually half of a cylinder of a radius the same as the radius of the cylinder containing the piston, and of a height determined by the stroke of each of the actuating portions of the split sleeve actuating means, intake and exhaust ports of very much greater area than have heretofore been attainable, are provided by the system of the present invention. In this connection, it should be noted that there is no obstruction in the flow path through either of the two ports, when opened, in the undesirable manner of prior art poppet valve constructions and prior art multiply apertured sleeve valve constructions.

It should also be noted that the form of the present invention having an angularly inclined, upwardly and inwardly facing engaging surface carried at the upper end of the cylindrical sleeve valve means and arranged for valve opening and valve closing co-operation with the corresponding angularly inclined outwardly and downwardly facing valve seat means, provides an arrangement wherein the opening and closing movement of the sleeve valve is of an extremely rapid nature assuming the general characteristics of poppet valve action without, however, the undesirable features thereof. This arrangement is also advantageous because high pressure in the cylinder during the compression and firing strokes produces a positive seal of the sleeve valve means with respect to the valve seat means, which increases in efficacy with increasing pressure in the cylinder.

It should also be noted that, in addition to extremely large effective valve port areas and extremely rapid effective valve opening and valve closing action, and the lack of any obstructions whatsoever in the open valve ports, the system of the present invention provides an extremely simple, efficient and cheap mechanical structure requiring no head gasket and wherein no parts of the valving arrangement will be subject to excessive wear, stresses and/or breakage, as frequently occurs in prior art systems.

Furthermore, the rocker arm arrangement of the present invention is of extremely simple, cheap, foolproof construction and is capable of operating with push-rods, cams, cam shafts and the like in a manner well known in the automotive art.

With the above points in mind, it is an object of the present invention to provide an improved sleeve valve system for use in reciprocating-piston, internal combustion engines, and having extremely large valve intake port means and valve exhaust port means for the cylinder size of the engine.

It is the further object of the present invention to provide a system of the type set forth in the preceding object wherein the valve means is of extremely rapid opening and rapid closing type by reason of the novel structure of a sleeve valve means and cooperating valve seat means.

It is the further object of the present invention to provide a system of the type set forth in either or both of the preceding objects, wherein the valve port means are virtually completely unobstructed when effectively opened.

It is the further object of the present invention to provide a system of the type set forth in any or all of the preceding objects of exceedingly simple, cheap, fool-proof easy-to-assemble and dis-assemble construction.

Other and allied objects will be apparent to those skilled in the art, after a careful perusal, examination and study of the accompanying illustrations, the present specification and the appended claims.

To facilitate understanding, reference will be made to the hereinbelow described drawings, in which:

Fig. 1 is a reduced size, vertical sectional view (except for the piston and spring) of one illustrative embodiment of the present invention taken in the direction of the arrows I—I in Fig. 2.

Fig. 2 is a top plan view of the embodiment of the invention shown in Fig. 1 (with the top cover member removed however, for clarity and with the outer portions of the cylinder wall 1 and the push-rods 37 and 38 also removed for clarity).

Figure 1:
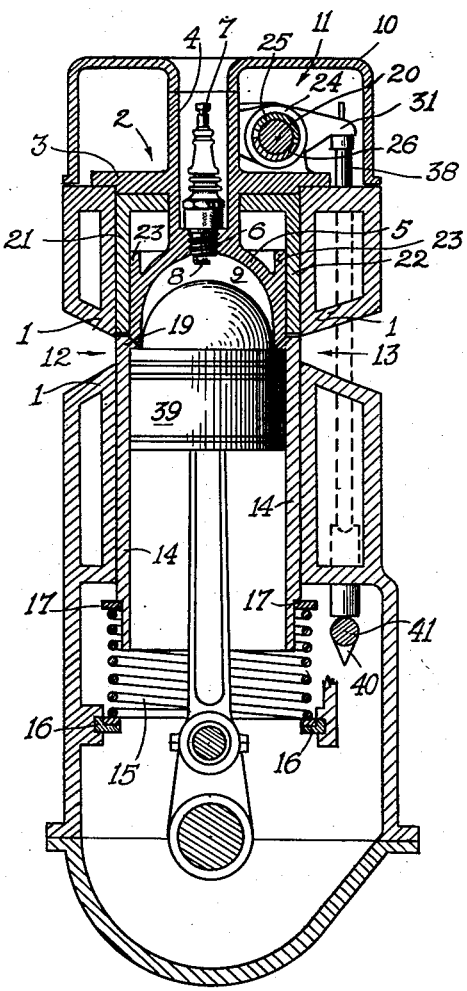
Figure 2:
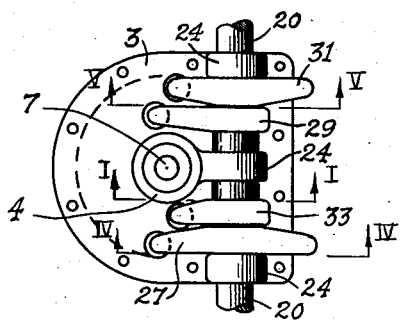
Figure 7:
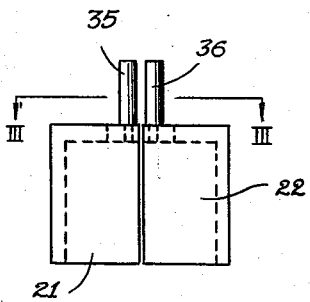
Fig. 7 is an end elevation taken in the direction of the arrows VII—VII in Fig. 3 and 6, of the split sleeve actuating means and actuating pins alone.
Figure 6:
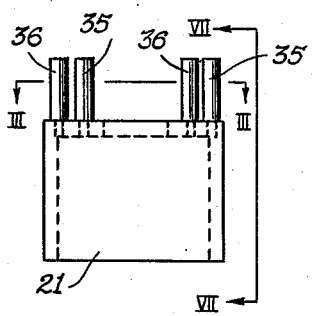
Fig. 6 is a side elevation, taken in the direction of the arrows VI—VI in Fig. 3, of the split sleeve actuating means and actuating pins alone.
Figure 3:
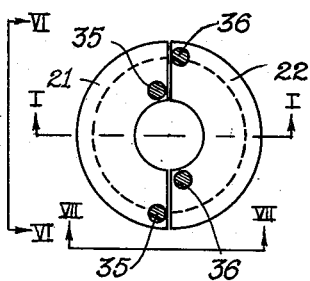
Fig. 3 is a top plan view of the split sleeve actuating means and actuating pins (in section) only.

Generally speaking, the system of the present invention includes an engine cylinder defined by a cylinder wall and a cylinder head across one end thereof. In the specific example illustrated, the cylinder wall is indicated at 1, and the cylinder head is indicated generally at 2, and comprises a circular flat portion 3 adapted to be fastened to the effective upper end of the cylinder wall 1, and a central well shaped portion 4 carrying a domed cylinder closing surface 5 at the bottom thereof, the center of which is provided with a threaded opening 6 adapted to removably receive a spark plug 7 therein with the points 8 within the cylinder combustion chamber 9. It should also be noted that a cover member 10 is provided for the purpose of effectively covering the top 3 of the cylinder and the rocker arm means, indicated generally at 11, which will be explained more fully hereinafter.

Also generally speaking, fuel intake port means and combustion products exhaust port means are provided in the cylinder wall. In the specific example illustrated, the fuel intake port means comprises a somewhat less than semi-cylindrical opening 12 and the combustion products exhaust port means comprises a similar somewhat less than semi-cylindrical opening 13.

Also generally speaking, cylindrical sleeve valve means is slidably mounted within the cylinder walls adjacent the inner surface thereof for slidable valve-opening and/or valve-closing reciprocating movement across the intake port means and the exhaust port means. In the specific example illustrated, this takes the form of a cylindrical sleeve valve member 14.

Means is provided for normally biasing the sleeve valve means toward a valve seat means, which is positioned adjacent the cylinder wall and adjacent the intake and exhaust port means. In the specific example illustrated, the biasing means comprises compression spring means 15 positioned between a fixed annular member 16 and a second annular member 17 carried by the sleeve 14 adjacent its lower end, whereby the sleeve valve 14 will be normally upwardly biased into engaging contact with respect to the valve seat means 18 carried by the dome portion 5 of the cylinder head.

In the specific example illustrated, it should be noted that the upper end of the sleeve valve 14 is provided with inwardly directed shoulder means 19 having an angularly inclined, upwardly and inwardly facing engaging surface in engagement with a corresponding angularly inclined but downwardly and outwardly facing valve seat means 18 carried by the dome portion 5. The arrangement is such that upward movement of the sleeve valve 14 into the position shown in Fig. 1 causes an effective seal to exist between said angularly inclined surfaces, and this seal is rendered even more efficient by increased pressure on shoulder 19 in the combustion chamber 9 during compression and firing strokes.

Also generally speaking, split sleeve actuating means having two actuating portions of arcuate virtually semi-cylindrical shape and independently slidably positioned with respect to the inner sides of the cylinder wall and in abutting relationship with respect to the cylndrical sleeve valve means are provided.

Figure 4:
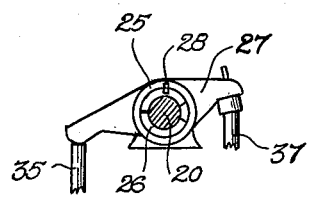
Fig. 4 is a fragmentary view, partly in vertical section, of the rocker arm means only taken in the direction of the arrows IV—IV in Fig. 2 and illustrates one of the exhaust rocker arms.
Figure 5:
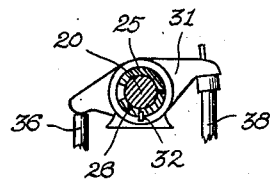
Fig. 5 is a fragmentary view, partly in vertical section, of the rocker arm means only taken in the direction of the arrows V—V in Fig. 2, and illustrates one of the intake rocker arms.
Figure 10:
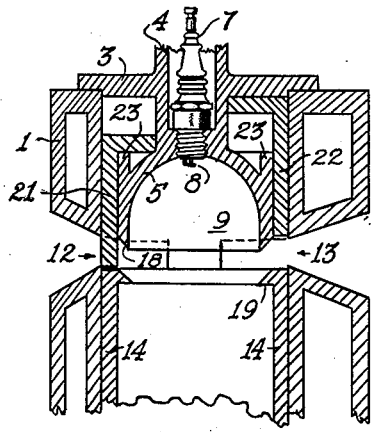
Fig. 10 is a fragmentary vertical sectional view similar in aspect to Fig. 1 but shows the exhaust port open in the position it assumes when the rocker arm means, shown in Fig. 4, is actuated in counter-clockwise direction moving the split sleeve means into the position shown in Fig. 8.
Figure 11:
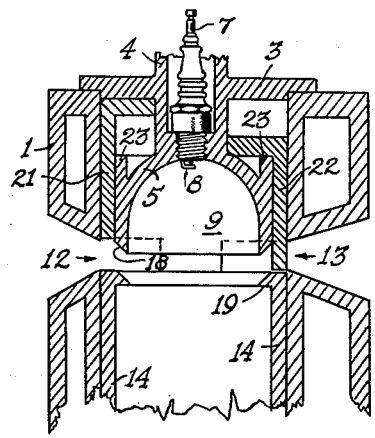
Fig. 11 is a fragmentary vertical sectional view similar in aspect to Fig. 1 but shows the intake port open in the position it assumes when the rocker arm means, shown in Fig. 5, is actuated in counter-clockwise direction moving the split sleeve means into the position shown in Fig. 9.
Figure 8:
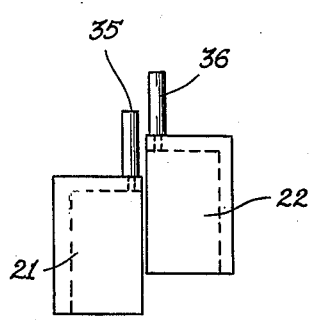
Fig. 8 is a view similar to Fig. 7 but shows the left (exhaust) pair of actuating pins and the left (exhaust) portion of the split sleeve actuating means in fully actuated position.
Figure 9:
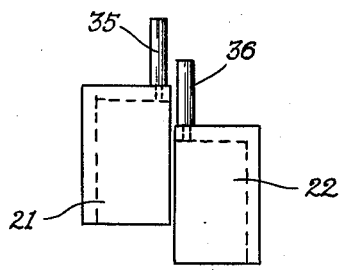
Fig. 9 is a view similar to Fig. 7 but shows the right (intake) pair of actuating pins and the right (intake) portion of the split sleeve actuating means in fully actuated position.

In the specific example illustrated, the exhaust valve actuating portion of the split sleeve actuating means is indicated at 21 and the intake valve actuating portion of the split sleeve actuating means is indicated at 22. It will be noted that each of the actuating portions is slidably positioned between the cylinder wall 1 and an upstanding wall portion 23 carried by the fixed cylinder head whereby each of the actuating portions 21 and 22 of the split sleeve actuating means can be independently slidably downwardly moved across the corresponding port means 12 and/or 13 whereby to effectively close same and to simultaneously move the entire sleeve valve 14 downwardly whereby to effectively open the opposite port. This is illustrated in Figs. 4, 8 and 10 (which go together) and in Figs. 5, 9 and 11 (which also go together). In Figs. 8 and 10 the actuating portion 21 is shown in its downward extreme position wherein it has effectively closed the intake port 12 and has simultaneously moved the sleeve valve 14 downwardly whereby to effectively open the exhaust port 13. Figs. 5, 9 and 11 illustrate the opposite of Figs. 4, 8 and 10. In Figs. 9 and 11 the other sleeve actuating portion 22 is shown in its downward extreme position across and effectively closing the exhaust port 13, and effectively causing the opening of the intake port 12 because the sleeve valve 14 is held in its lowermost position. It will be understood that after the completion of the intake stroke as shown in Figs. 5, 9 and 11, and also after completion of the exhaust stroke, as shown in Figs. 4, 8 and 10, the spring means 15, shown in Fig. 1, will cause the sleeve valve 14 to move upwardly into the position shown in Fig. 1, effectively closing both the intake port 12 and the exhaust port 13.

Also generally speaking, the present invention includes means (usually rocker arm means), in cooperative actuating relationship with respect to each of the actuating portions of the split sleeve actuating means and mechanically effectively linked with respect to a piston adapted to be slidably reciprocably mounted in the cylinder, whereby each actuating portion of said split sleeve means will be actuated at the proper time to open and close the intake port means and the exhaust port means at the proper times and in the proper sequence during the operating cycle of the engine.

In the specific example illustrated, this takes the form of rocker arm means, indicated generally at 11, and including horizontally mounted shaft means 20 carried in fixed support members 24, an upper and a lower rocker sleeve or bushing means 25 and 26 in the form of two longitudinal arcuate portions in less than 360 degrees of rotary engagement with respect to the shaft means 20, a first rocker arm 27 (best shown in Fig. 4) effectively fastened by key means 28 to the first of said sleeve portions 25, a second rocker arm 29 effectively fastened by key means (not shown but similar to 28) to the first of said sleeve portions 25, a third rocker arm 31 (best shown in Fig. 5) effectively fastened by key means 32 to the second of said sleeve portions 26 and a fourth rocker arm 33 effectively fastened by key means (not shown but similar to 32) to said second sleeve portion 26. It will be understood that the first and second rocker arms 27 and 29 are provided with actuating portions 35 extending into effective actuating relationship (through holes in top plate 3) with respect to the exhaust valve actuating portion 21 of the split sleeve actuating means. It will also be understood that the third and fourth rocker arms 31 and 33 are provided with actuating portions (pins) 36 extending through holes in the top plate 3 into effective actuating relationship with respect to the intake valve actuating portion 22 of the split sleeve actuating means. The arrangement is such that upward movement of the right hand end of the rocker arm 27 (as best shown in Fig. 4) by the pushrod 37 will cause the actuating portions (pins) 35 of both the rocker arms 27 and 29 to move downwardly thereby moving the virtually semi-cylindrical sleeve-like actuating portion 21 downwardly into the position shown in Figs. 4, 8 and 10, thus effectively opening the exhaust port 13. Later on, during the operating cycle of the engine, when the push-rod 38 is moved upwardly (as best shown in Fig. 5) the actuating portions (pins) 36 of the rocker arms 31 and 33 will be moved downwardly, thus moving the actuating sleeve portion 22 downwardly into the position shown in Figs. 5, 9 and 11, and effectively opening the intake port 12.

It will be understood that the two push-rods 37 and 38 are adapted to be effectively mechanically linked in different time relationships with respect to the movement of the piston (39 in Fig. 1) whereby the intake port 12 and the exhaust port 13 will be effectively opened and/or closed at the proper times with respect to the operating cycle of the engines. This may take the form of any suitable linkage means, such as, for example, the cam 40 and cam shaft 41, which is effectively linked to the crank shaft and thus to the piston 39.

The operation of the system specifically described and illustrated herein, may be very briefly set forth as follows: The piston 39 moves downwardly from the position shown in Fig. 1 while at the same time the push-rod 38 is driven by the cam 40 upwardly into the position shown in Fig. 5. This causes the mechanically linked rocker arms 31 and 33 to effectively move downwardly the actuating portion 22 of the split sleeve actuating means into the position shown in Figs. 9 and 11, thus effectively opening the intake valve port 12. Then the push-rod 38 moves downwardly, under the control of the cam 40, allowing the spring means 15 to effectively move the sleeve valve 14 upwardly, thus closing both the intake port 12 and the exhaust port 13, as shown in Fig. 1. Then the piston 39 moves upwardly, during the compression stroke, into the position shown in Fig. 1 and the spark plug 7 effectively ignites the compressed fuel in the chamber 9, which expands rapidly, driving the piston 39 downwardly during the firing stroke. Then the push-rod 37 moves upwardly under the control of a cam (not shown but similar to the cam 40), thus actuating the mechanically linked rocker arms 27 and 29 into the position shown in Fig. 4, and thus causing the actuating portion 21 of the split sleeve actuating means to move downwardly into the position shown in Figs. 8 and 10, thus effectively opening the exhaust port 13. Then the piston 39 moves upwardly in the exhaust stroke, at the end of which the push-rod 37 moves downwardly again releasing the actuating portion 21 and allowing the spring 15 to move the sleeve valve 14 upwardly into a position effectively closing both the intake valve port 12 and the exhaust port 13, as shown in Fig. 1. The above described cycle of operations will then be repeated.

Numerous modifications and variations of the present invention will occur to those skilled in the art, after a careful study hereof. All such properly within the spirit and scope of the present invention are intended to be included and comprehended as fully as if specifically described, illustrated and claimed herein.

For example, the exact configuration of the sleeve valve, the inwardly directed angularly inclined engaging shoulder thereof and the cooperating valve seat means can be modified substantially within the spirit of the present invention. This is also true of the structure and positioning of the valve port means and the sleeve valve biasing means.

It should also be noted that the split sleeve actuating means can assume a number of different structural forms, within the inventive concept hereof, as may the means for actuating them. Said actuating means can comprise modified rocker arm means or a number of other means for effectively mechanically linking the split sleeve means with respect to the operating cycle of the engine, so as to cause properly timed actuation of the split sleeve means. The structure of the cylinder wall, cylinder head and cover member can be modified substantially, (or certain portions thereof can be eliminated entirely if desired). The push-rod and cam shaft arrangement can be substantially modified or eliminated and other equivalent means substituted therefor, if desired.

The exact confiuration, shape, composition and relative positioning of the various component parts of the present invention are not critical, and can be modified substantially within the spirit hereof.

The embodiment of the present invention specifically described and illustrated herein is exemplary only, and is not intended to limit the scope of the present invention, which is to be interpreted in the light of the prior art and the appended claims only, with due consideration for the doctrine of equivalents.

I claim:

1. An improved sleeve valve system for use in reciprocating-piston internal combustion engines, comprising: a cylinder defined by a cylinder wall and a cylinder head across one end thereof; fuel intake port means in said cylinder wall; combustion products exhaust port means in said cylinder wall; cylindrical sleeve valve means slidably mounted within the cylinder wall adjacent the inner surface thereof, for slidable valve opening and valve closing reciprocating movement across the intake port means and the exhaust port means; valve seat means positioned adjacent the cylinder wall and adjacent the intake port means and the exhaust port means; and means normally biasing the sleeve valve means against said valve seat means whereby to effectively seal and close both the intake port means and the exhaust port means; split sleeve actuating means having actuating portions of arcuate shape slidably positioned with respect to the inner side of the cylinder wall and in abutting relationship with respect to the cylindrical sleeve valve means whereby reciprocating actuation of the first of said split sleeve actuating portions against the sleeve valve and across the first of said port means will cause said sleeve valve to slidably move against the action of the biasing means in a manner whereby the second of said port means will be rapidly and effectively opened; and whereby reciprocating actuation of the second of said split sleeve actuating portions against the sleeve valve and across the second of said port means will cause said sleeve valve to slidably move against the action of the biasing means in a manner whereby the first of said port means will be rapidly and effectively opened; and means in cooperative actuating relationship with respect to the split sleeve means adapted to be mechanically effectively linked with respect to a piston adapted to be slidably reciprocably mounted in the cylinder whereby each actuating portion of said split sleeve means will be actuated at the proper time to open and close the intake port means and the exhaust port means at the proper times and in the proper sequence during the operating cycle of the engine.

2. A system of the character defined in claim 1 wherein the valve seat means is provided with an angularly inclined downwardly and outwardly facing surface and wherein the cylindrical sleeve valve means is provided with an inwardly directed shoulder having an angularly inclined upwardly and inwardly facing engaging surface adapted to normallly sealingly abut and engage the inclined surface of the valve seat means and adapted under the action of high pressure within the cylinder to be effectively forced against the inclined surface of said valve seat means thereby increasing the efficacy of the seal therebetween.

3. An improved sleeve valve system for use in reciprocating-piston internal combustion engines, comprising: a cylinder defined by a cylinder wall and a cylinder head across one end thereof; fuel intake port means in said cylinder wall; combustion products exhaust port means in said cylinder wall; cylindrical sleeve valve means slidably mounted within the cylinder wall adjacent the inner surface thereof, for slidable valve opening and valve closing reciprocating movement across the intake port means and the exhaust port means; valve seat means carried by the cylinder head adjacent the intake port means and the exhaust port means; and spring means normally biasing the sleeve valve means against said valve seat means whereby to effectively seal and close both the intake port means and the exhaust port means; split sleeve actuating means having actuating portions of arcuate shape slidably positioned with respect to the inner side of the cylinder wall and in abutting relationship with respect to the cylindrical sleeve valve means whereby reciprocating actuation of the first of said split sleeve actuating portions against the sleeve valve and across the first of said port means will cause said sleeve valve to slidably move against the action of the biasing spring means in a manner whereby the second of said port means will be rapidly and effectively opened; and whereby reciprocating action of the second of said split sleeve actuating portions against the sleeve valve and across the second of said port means will cause said sleeve valve to slidably move against the action of the biasing means in a manner whereby the first of said port means will be rapidly and effectively opened; and means in cooperative actuating relationship with respect to the split sleeve means adapted to be mechanically effectively linked with respect to a piston adapted to be slidably reciprocably mounted in the cylinder whereby each actuating portion of said split sleeve means will be actuated at the proper time to open and close the intake port means and the exhaust port means at the proper times and in the proper sequence during the operating cycle of the engine.

4. A system of the character defined in claim 3 wherein the valve seat means is provided with an angularly inclined downwardly and outwardly facing surface and wherein the cylindrical sleeve valve means is provided with an inwardly directed shoulder having an angularly inclined, upwardly and inwardly facing engaging surface adapted to normally sealingly abut and engage the inclined surface of the valve seat means and adapted under the action of high pressure within the cylinder to be effectively forced against the inclined surface of said valve seat means, thereby increasing the efficacy of the seal therebetween.

5. An improved sleeve valve system for use in reciprocating-piston internal combustion engines, comprising: a cylinder defined by a cylinder wall and a cylinder head across one end thereof; fuel intake port means in said cylinder wall; combustion products exhaust port means in said cylinder wall; cylindrical sleeve valve means slidably mounted within the cylinder wall adjacent the inner surface thereof, for slidable valve opening and valve closing reciprocating movement across the intake port means and the exhaust port means; valve seat means positioned adjacent the cylinder wall and adjacent both the intake port means and the exhaust port means; and means normally biasing the sleeve valve means against said valve seat means whereby to effectively seal and close both the intake port means and the exhaust port means; split sleeve actuating means having actuating portions of arcuate shape slidably positioned with respect to the inner side of the cylinder wall and in abutting relationship with respect to the cylindrical sleeve valve means whereby reciprocating actuation of the first of said split sleeve actuating portions against the sleeve valve and across the first of said port means will cause said sleeve valve to slidably move against the action of the biasing means in a manner whereby the second of said port means will be rapidly and effectively opened; and whereby reciprocating actuation of the second of said split sleeve actuating portions against the sleeve valve and across the second of said port means will cause said sleeve valve to slidably move against the action of the biasing means in a manner whereby the first of said port means will be rapidly and effectively opened; and pivotally mounted rocker arm means in actuating relationship with respect to the actuating portion of the split sleeve actuating means and also effectively mechanically linked with respect to a piston adapted to be slidably reciprocably mounted in the cylinder whereby each actuating portion of said split sleeve actuating means will be actuated at the proper time to open and close the intake port means and the exhaust port means at the proper times and in the proper sequence during the operating cycle of the engine.

6. A system of the character defined in claim 5 wherein the rocker arm means includes shaft means, rocker sleeve means in two longitudinal arcuate portions in less than 360 degrees of engagement with respect to the shaft means, a first rocker arm effectively fastened to the first of said sleeve portions, a second rocker arm effectively fastened to the first of said sleeve portions, a third rocker arm effectively fastened to the second of said sleeve portions and a fourth rocker arm effectively fastened to the second of said sleeve portions, said first and second rocker arms being provided with actuating portions in effective actuating relationship with respect to the first actuating portion of the split sleeve actuating means, said third and fourth rocker arms being provided with actuating portions in effective actuating relationship with respect to the second actuating portion of the split sleeve actuating means, said first and third rocker arms being effectively linked in different time relationships with respect to a piston adapted to be slidably reciprocably mounted in the cylinder whereby each actuating portion of said split sleeve actuating means will be actuated at the proper time to open and close the intake port means and the exhaust port means at the proper times and in the proper sequence during the operating cycle of the engine.

7. A system of the character defined in claim 6 wherein the valve seat means is provided with an angularly inclined downwardly and outwardly facing surface and wherein the cylindrical sleeve valve means is provided with an inwardly directed shoulder having an angularly inclined upwardly and inwardly facing engaging surface adapted to normally sealingly abut and engage the inclined surface of the valve seat means and adapted under the action of high pressure within the cylinder to be effectively forced against the inclined surface of said valve seat means, thereby increasing the efficacy of the seal therebetween.

8. An improved sleeve valve system for use in reciprocating-piston internal combustion engines, comprising: a cylinder defined by a cylinder wall and a cylinder head across one end thereof; fuel intake port means in said cylinder wall; combustion products exhaust port means in said cylinder wall; cylindrical sleeve valve means slidably mounted within the cylinder wall adjacent the inner surface thereof for slidable valve opening and valve closing reciprocating movement across the intake port means and the exhaust port means; valve seat means carried by the cylinder head adjacent the intake port means and the exhaust port means; and spring means normally biasing the sleeve valve means against said valve seat means whereby to effectively seal and close both the intake port means and the exhaust port means; split sleeve actuating means having actuating portions of arcuate shape slidably positioned with respect to the inner side of the cylinder wall and in abutting relationship with respect to the cylindrical sleeve valve means whereby reciprocating actuation of the first of said split sleeve actuating members against the sleeve valve and across the first of said port means will cause said sleeve valve to slidably move against the action of the biasing spring means in a manner whereby the second of said port means will be rapidly and effectively opened; and whereby reciprocating actuation of the second of said split sleeve actuating members against the sleeve valve and across the second of said port means will cause said sleeve valve to slidably move against the action of the biasing spring means in a manner whereby the first of said port means will be rapidly and effectively opened; and pivotally mounted rocker arm means in actuating relationship with respect to the actuating portions of the split sleeve actuating means and also effectively mechanically linked with respect to a piston adapted to be slidably reciprocably mounted in the cylinder whereby each actuating portion of said split sleeve means will be actuated at the proper time to open and close the intake port means and the exhaust port means at the proper times and in the proper sequence during the operating cycle of the engine.

9. A system of the character defined in claim 8 wherein the rocker arm means includes shaft means, rocker sleeve means in two longitudinal arcuate portions in less than 360 degrees of engagement with respect to the shaft means, a first rocker arm effectively fastened to the first of said sleeve portions, a second rocker arm effectively fastened to the first of said sleeve portions, a third rocker arm effectively fastened to the second of said sleeve portions and a fourth rocker arm effectively fastened to the second of said sleeve portions, said first and second rocker arms being provided with actuating portions in effective actuating relationship with respect to the first actuating portion of the split sleeve actuating means, said third and fourth rocker arms being provided with actuating portions in effective actuating relationship with respect to the second actuating portion of the split sleeve actuating means, said first and third rocker arms being effectively linked in different time relationships with respect to a piston adapted to be slidably reciprocably mounted in the cylinder whereby each actuating portion of said split sleeve actuating means will be actuated at the proper time to open and close the intake port means and the exhaust port means at the proper times and in the proper sequence during the operating cycle of the engine.

10. A system of the character defined in claim 9 wherein the valve seat means is provided with an angularly inclined downwardly and outwardly facing surface and wherein the cylindrical sleeve valve means is provided with an inwardly directed shoulder having an angularly inclined, upwardly and inwardly facing engaging surface adapted to normally sealingly abut and engage the inclined surface of the valve seat means and adapted under the action of high pressure within the cylinder to be effectively forced against the inclined surface of said valve seat means, thereby increasing the efficacy of the seal therebetween.

11. An improved sleeve valve system for use in reciprocating-piston internal combustion engines, comprising: a cylinder defined by a cylinder wall and a cylinder head across one end thereof; fuel intake port means in said cylinder wall; combustion products exhaust port means in said cylinder wall; cylindrical sleeve valve means slidably mounted within the cylinder wall adjacent the inner surface thereof, for slidable valve opening and valve closing reciprocating movement across the intake port means and the exhaust port means; valve seat means positioned adjacent the cylinder wall and adjacent the intake port means and the exhaust port means; and means normally biasing the sleeve valve means against said valve seat means whereby to effectively seal and close both the intake port means and the exhaust port means; split sleeve actuating means having actuating portions of arcuate shape slidably positioned with respect to the inner side of the cylinder wall and in abutting relationship with respect to the cylindrical sleeve valve means whereby reciprocating actuation of the first of said split sleeve actuating portions against the sleeve valve and across the first of said port means will cause said sleeve valve to slidably move against the action of the biasing means in a manner whereby the second of said port means will be rapidly and effectively opened; and whereby reciprocating actuation of the second of said split sleeve actuating portions against the sleeve valve and across the second of said port means will cause said sleeve valve to slidably move against the action of the biasing means in a manner whereby the first of said port means will be rapidly and effectively opened; and means in cooperative actuating relationship with respect to the split sleeve means adapted to be mechanically effectively linked with respect to a piston adapted to be slidably reciprocably mounted in the cylinder whereby each actuating portion of said split sleeve means will be actuated at the proper time to open and close the intake port means and the exhaust port means at the proper times and in the proper sequence during the operating cycle of the engine; said valve seat means being angularly inclined and said cylindrical sleeve means being provided with similarly angularly inclined engaging means adapted to normally sealingly abut and engage the angularly inclined valve seat means, the angular inclination of the valve seat means and the engaging means carried by the sleeve valve means being such that higher pressure within the cylinder will effectively force said valve seat means and said engaging means tightly together, increasing the efficacy of the seal therebetween.

References Cited in the file of this patent

UNITED STATES PATENTS

| Number | Name | Date |
|---|---|---|
| 1,121,131 | Redrup | Dec. 15, 1914 |
| 1,259,891 | Marr | Mar. 19, 1918 |
| 1,308,560 | Stokes | July 1, 1919 |
| 1,377,798 | Berckenhoff | May 10, 1921 |
| 1,860,667 | Flaker | May 31, 1932 |